July 8, 1969 T. P. HUDAK 3,454,304
CHILD'S SAFETY SEAT

Filed Sept. 22, 1967 Sheet 1 of 2

INVENTOR.
THOMAS P. HUDAK
BY *Freeman & Taylor*
ATTORNEYS

July 8, 1969 T. P. HUDAK 3,454,304
CHILD'S SAFETY SEAT
Filed Sept. 22, 1967 Sheet 2 of 2
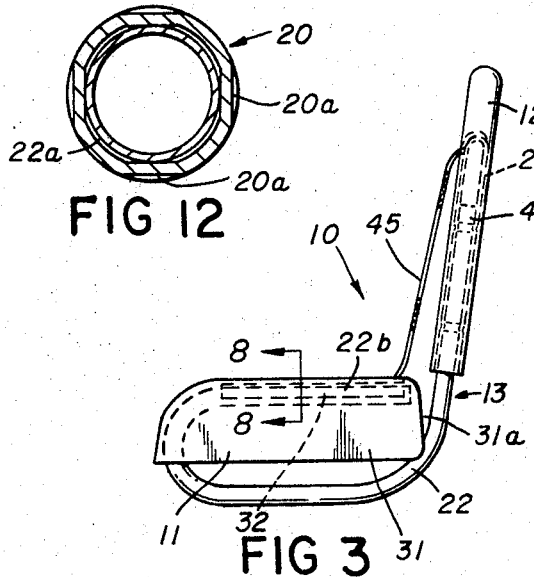
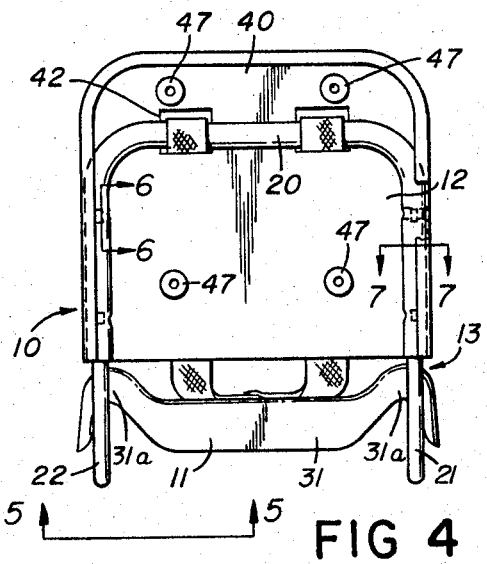
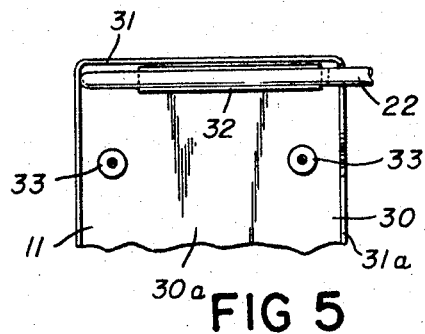
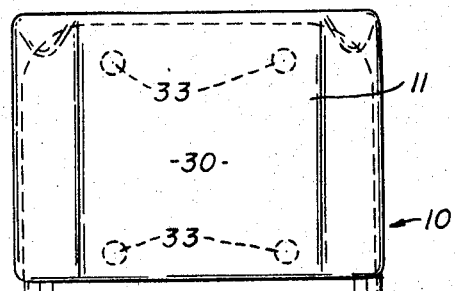
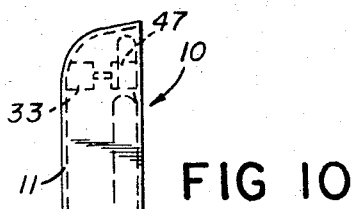
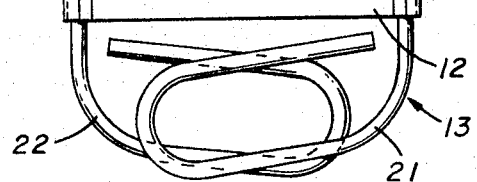
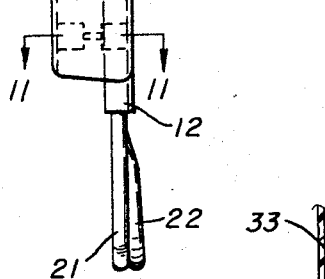
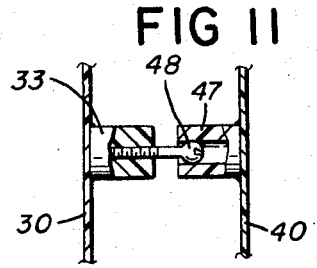
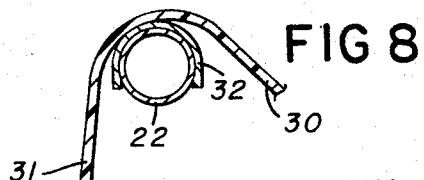
INVENTOR.
THOMAS P. HUDAK
BY Freeman & Taylor
ATTORNEYS United States Patent Office 3,454,304
Patented July 8, 1969

3,454,304
CHILD'S SAFETY SEAT
Thomas P. Hudak, Akron, Ohio, assignor to Akron
National Bank and Trust Company, Akron, Ohio,
a national banking association
Filed Sept. 22, 1967, Ser. No. 674,049
Int. Cl. A47c 31/00; A47d 1/00; B60r 21/10
U.S. Cl. 297—389                         10 Claims

ABSTRACT OF THE DISCLOSURE

A safety seat for use by a child in an automobile characterized by the fact that it not only elevates a child's view so as to permit him to see from the interior of the car, but further is constructed so as to be rigid in use for optimum safety purposes while being collapsible for storage during periods of non-use.

The device is also characterized by the use of a loop-type safety web that can be quickly connected to the main seat belt of the car so as to permit coaction between the child's safety seat and any standard conventional safety belt of an automobile.

RELATED APPLICATION

In applicant's earlier filed application, Ser. No. 321,024 filed Nov. 4, 1963, there was disclosed a safety seat achieving the general objects of this invention. While the operating principles of this earlier filed application were broadly the same as the operating principles of the present application, the present application includes refinements in the construction and provision of improved means for readily collapsing the unit for storage purposes.

BACKGROUND OF THE INVENTION

Field of the invention

The present invention is directed to improving the safety of a child riding in an automobile while simultaneously making such travel more enjoyable and raising the height of the child to a position where he can enjoy a better view of the surrounding scenery during the period of travel.

Description of the prior art

The following patents are believed representative of the earlier prior art in this field: Mueller, U.S. Patent 2,276,857; Smith, U.S. Patent 2,308,315; Kindelberger, U.S. Patent 2,664,140; Travis, U.S. Patent 2,777,502; Grieco, U.S. Patent 3,103,385; and Reagan, U.S. Patent 3,220,769.

It will be noted that these prior art patents generally are characterized by the fact that the same require a special harness-type of arrangement to be provided as a permanent component of the automobile and further that the same secure the child with respect to the seat by securing the belt members only around the hips and waist portion of the child.

SUMMARY OF THE INVENTION

Applicant has discovered that optimum safety can be assured for a child riding in a car if the restraining or seat belt portion of the child's auxiliary seat is positioned in such a way as to brace the child in the shoulder area so as to prevent the child's head from flying forward in the event of a collision or other sudden stop.

Applicant achieves this advantage by using a flexible safety belt that has its ends secured or anchored to the upper portion of the back support member of the auxiliary seat so as to form a loop that can be slipped over the child's head and thence connected with the usual seat belt of the automobile so as to anchor the seat per se to the car while simultaneously providing a shoulder support for the occupant.

Additionally, while optimum safety requires a rigid immovable relationship between the back and seat portions of the child's seat, it is obvious that storage of the seat during periods of non-use dictates some form of reduction in the overall size. Applicant has accordingly made the seat portion of the child's safety seat detachable and has further provided that the frame that receives the seat support portion be pivotable with regard to the back portion so as to fold over each other within the plane of the back support member. By this arrangement and by utilizing a novel interconnecting means, applicant materially reduces the size of the child's safety seat while simultaneously providing a carrying handle for the same.

Production of an improved child's safety seat having the above advantages accordingly becomes the principal object of this invention with other objects thereof becoming more apparent upon a reading of the following brief specification, considered and interpreted in the light of the accompanying drawings.

Of the drawings:

FIGURE 3 is a side elevational view of the improved safety seat.

FIGURE 4 is a rear view of the improved child's safety seat.

Figure 6:
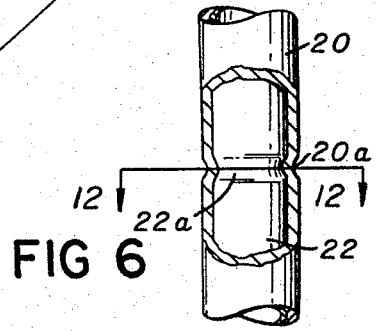
Figure 7:
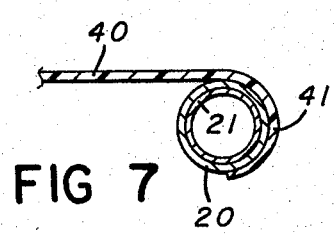

FIGURES 5, 6 and 7 are sectional views taken on the lines 5—5, 6—6 and 7—7 respectively of FIGURE 4.

FIGURE 8 is a sectional view taken on the lines 8—8 of FIGURE 3.

FIGURE 9 is a plan view showing the child's safety unit in its collapsed condition.

FIGURE 10 is an elevational view showing the unit in collapsed condition.

FIGURE 11 is a sectional view taken on the lines 11—11 of FIGURE 10.

FIGURE 12 is a sectional view taken on the lines 12—12 of FIGURE 6.

Figure 1:
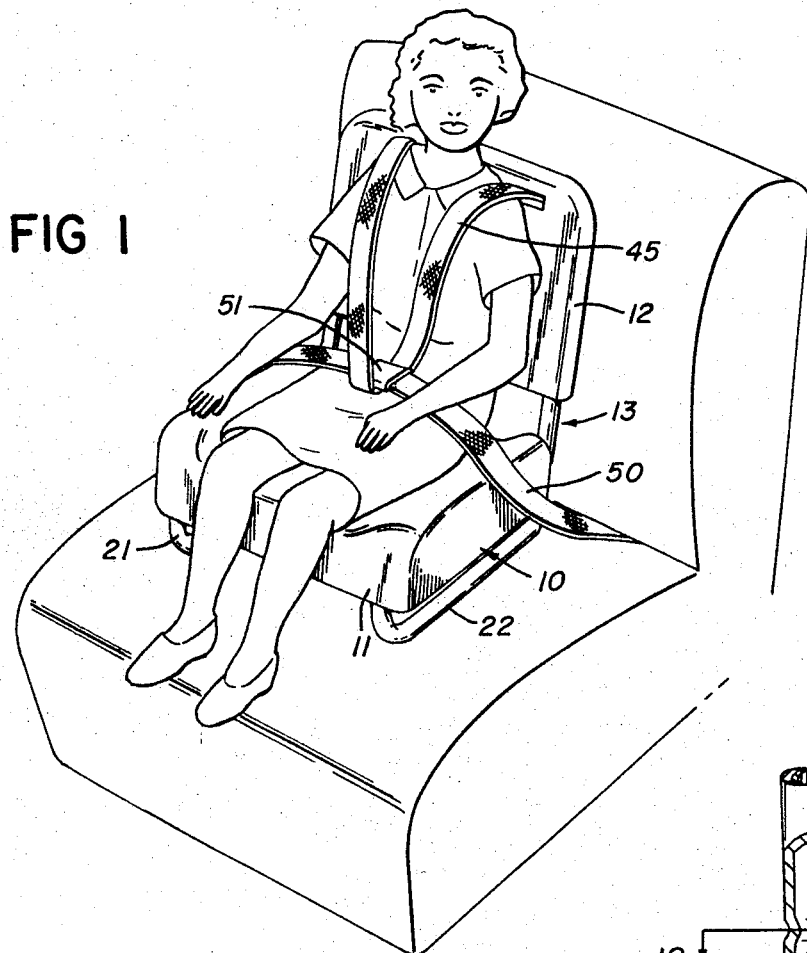
FIGURE 1 is a perspective view of the child's safety seat showing how the same can be utilized in an automobile for example.

Referring now to the drawings and in particular to FIGURES 1 through 4 thereof, the child's safety seat generally designated by the numeral 10, includes a seat support portion 11 and a back support portion 12 interconnected by a frame member that is generally indicated by the numeral 13 in FIGURE 1 of the drawings.

Figure 2:
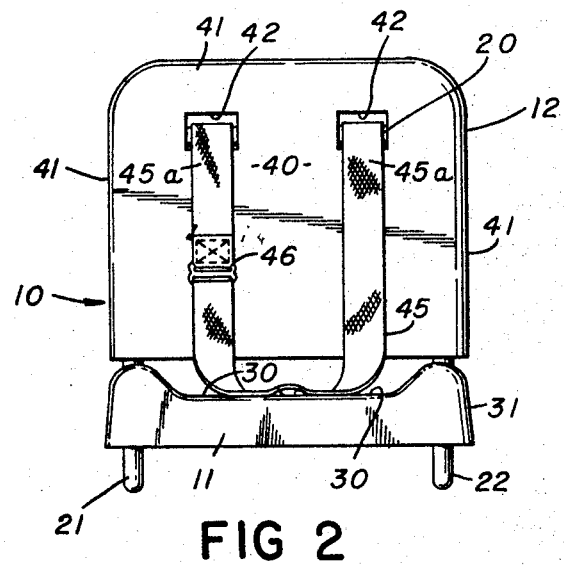
FIGURE 2 is a front elevational view of the improved safety seat.

With reference to this frame member 13, the construction thereof is best shown in FIGURES 2 through 4 wherein the frame member includes a U-shaped top portion 20, the leg portions of which telescopically receive auxiliary support frame members 21 and 22, with each frame member 21 and 22 being identical in configuration and with the frame portions 21 and 22 being bent upon themselves as best shown in FIGURE 3 so as to provide a point of support for seat portion 11 as will presently be described.

With regard to the interconnection of the frame 20 and the auxiliary side support frames 21 and 22, reference is had to FIGURES 4, 6 and 12 wherein it will be noted that the legs of frame 20 are provided with a series of flats 20a, 20a around their peripheries (see FIGURE 12) that ride within grooves 21a, 22a that are provided in the frame members 21 and 22 as best shown in FIGURES 4 and 6. By this arrangement, the frame members 21 and 22 can freely rotate about their axes with respect to the tubular frame 20 but axial separation there-from is prevented by the use of the flats riding within the grooves that are provided on the frame members 21 and 22.

By this arrangement, when the seat support member 11 is positioned on the frames 21 and 22 as shown in FIGURES 1 through 4, there will be a substantially right angle relationship between the back support member 12 and the seat support member 11. However, when the seat support member 11 is removed, as will presently be described, the legs 21 and 22 can be folded to the position shown in FIGURES 9 and 10 by merely pivoting the same around their axes of rotation in the opposed bottom portions of the main frame 20.

Turning now to the construction of the seat support member 11, it will be first noted that the same is formed, in the preferred embodiment of the invention, of a rigid plastic material that may be appropriately contoured to provide comfort to the infant occupying the same and can be readily detachable from the frame for storage purposes as has been earlier indicated.

Accordingly and referring to FIGURE 5, it will be noted that the seat support member 11 has a contoured central support plate 30 that is integral with a downwardly extending skirt 31 so as to give a somewhat hollow configuration thereto as clearly indicated in FIGURES 2 through 5 of the drawings. For the purpose of connecting the seat support member 11 to the frame, the lower face 30a of the central member 30 has a pair of elongated semi-circular caps 32, 32 secured adjacent the opposed edges of the same as best shown in FIGURES 3, 5 and 8 of the drawings. By this arrangement, the caps 32 may merely be slipped over the frame members 21 and 22 as clearly shown in FIGURE 8.

Additionally and as shown in FIGURE 4, the rearward portion of the skirt 31 extends as at 31a to a point that is lower than the rear end of rail portion 22b (FIGURE 3) of frame member 22 so that in the event of impact, the seat support member 11 will be prevented from sliding forwardly on the frame by virtue of the interference between the frame end 22b and the depending skirt portion 31a as shown in FIGURES 3 and 4.

In addition to the aforementioned components, the seat support member 30 further includes four plug members 33, 33 as best shown in FIGURES 5 and 11, with the function and purpose of these members being to provide a releasable interconnection with certain components of the back support member 12 as will presently be described.

Turning now to the construction of the back support member 12, the same is again made of plastic material so as to be stamped or otherwise formed to the appropriate contour shown in FIGURES 1 through 4 inclusive. In this regard, the member 12 includes a central section 40 as well as a downturned peripheral flange element 41 that extends along the top and opposed side portions of the member 12 as best shown in FIGURES 2 and 4 of the drawings. Principally the member 12 is permanently attached with respect to the frame 20 by having the flange 41 contoured to encircle substantially half the frame 20 as best shown in FIGURE 7 of the drawings.

In addition to the aforementioned component parts, the central portion 40 of the back support member 12 further includes spaced openings 42, 42 that are positioned in alignment with the base portion of the frame 20 so as to permit the ends 45a, 45a of the safety belt 45 to be received therethrough and secured around the frame 20 by stitching or other means as best shown in FIGURES 2 and 4 of the drawings.

It should be noted that adjustment means 46 are provided on the belt 45 so as to facilitate adjustment thereof to accommodate different ages and sizes of children.

Again referring to FIGURE 4 of the drawings, it will be noted that four female connections 47, 47 are provided on the rear face of the central portion 40 of back support 12 so as to cooperate with the projection plugs 33 and projecting pin 48 that are carried by the seat support member 30 that have been previously described.

In use or operation of the improved child's safety seat, it will first be assumed that the component parts have been assembled to operating condition as shown in FIGURE 1 and at this time, it is merely necessary that the child be placed on the seat support member 11 followed by dropping of the loop portion of belt 45 over the head of the child so as to engage the chest and shoulder portions of the child as shown in FIGURE 1. At this time, the car safety belt 50 can have the buckling portions 51 thereof passed through the belt 45 and drawn tight so as to cause the seat belts 45 and 50 to be interlocked as shown in FIGURE. 1.

By this arrangement, the seat belt 50 serves to firmly support the entire child's safety seat 10 with respect to the car seat as shown in FIGURE 1 and additionally, the child is given support against forward movement of the head and shoulder area in the case of a collision by the fact that the harness 45 is firmly positioned around the shoulders so as to prevent forward movement thereof.

In the event of an impact, the tendency would be for the back support member 12 to move forward, but in this instance, this is not possible because of the established and retained right angle relationship between the members 11 and 12. Accordingly in the event of impact, the seat 10 per se will merely have the front portions of the seat support member 11 moved downwardly into the car seat and at the same time, the forward movement of the child's head and shoulder portions would be restrained by the harness 45.

Removal of the child from the safety seat is facilitated by merely unbuckling the buckle 51 and lifting the belt harness 45 over the head so as to permit egress from the seat by the child.

When it is desired to store the unit, it is merely necessary that the seat support member 11 be snapped clear of the frame members 21 and 22 by causing the mounting brackets 32, 32 to be disengaged from these frame members as has earlier been discussed in connection with FIGURES 5 and 8 of the drawings.

With the seat support unit 11 removed, it is merely necessary that the same be positioned by the user so that the plugs 33, 33 thereof will register with sockets 47, 47 that are provided on the back of the support member 12, with this connection resulting in compacting of the unit to the condition of FIGURE 10. At this time, the legs 21, 22 may merely be folded over on each other as shown in FIGURE 9 so that not only is a compact unit provided but the legs serve as a carrying handle for the compact safety seat 10.

It will be seen from the foregoing how there has been provided a new and improved type of child's safety seat that is characterized by the provision of dual safety belts that simultaneously function to retain the safety seat in position on the car seat while simultaneously supporting the child's shoulders and head movements against dangerous forward movement in the event of collision.

It has been further shown how the improved child's safety seat can be made readily collapsible with this collapsible feature in no way detracting from the safety features that are the primary advantage of this child's safety seat.

While a full and complete disclosure of the invention has been set forth in accordance with the dictates of the Patent Statutes, it is to be understood that the invention is not to be limited to the specific form of the invention herein disclosed.

Accordingly, modifications of the invention may be resorted to without departing from the spirit hereof.

What is claimed is:

1. A child's safety seat of the character described, comprising:

(A) a back support member;

(B) a seat support member adapted to rest on the seat of an automobile or the like whereby the occupant thereof will be elevated with respect to said seat;

(C) frame means connecting said back and seat support members together in a substantially right angle relationship with each other;

(D) said frame means locking said back and seat support members in said right angle relationship during the period of connection therewith; and (E) a flexible safety belt having its ends secured to the upper portion of said back support member at transversely spaced points whereby the closed loop portion thereof may be placed over the shoulders of an occupant and connected to the main seat belt of the vehicle.

2. In combination with an automobile having a seat and seat belts thereon, comprising;

(A) a child'e safety seat adapted to be retained in position on the car seat by the car seat belt; and (B) a safety harness means carried by said safety seat and coacting with said car seat belt to restrain shoulder movement of said child with respect to said safety seat when said seat belt is operatively positioned in said automobile.

3. A child's safety seat for use on the seat of a vehicle having safety belts of the character described, comprising;

(A) a frame;

(B) a back support member
   (1) mounted on said frame;

(C) a seat support member
   (1) removably mounted on said frame at substantially right angles to said back support member;

(D) auxiliary seat belt means carried by said back support member and adapted to be interconnected with said safety belt
   (1) whereby the shoulders of said child are retained in said safety seat and said safety seat is retained in place on the seat of said vehicle; and (E) means carried by said back and seat support members and adapted to interconnect said back and seat support member when said seat support is removed from said frame.

4. The device of claim 3 further characterized by the fact that means carried by said back support for interconnection with said safety belt include a pair of elongate straps, each having one end secured to the top of said frame; and interlocking buckle means carried on their opposed ends.

5. A child's safety seat for use on the seat of a vehicle having safety belts of the character described, comprising;

(A) a frame;

(B) a back support member
   (1) mounted on said frame;

(C) a seat support member
   (1) removably mounted on said frame at substantially right angles to said back support member;

(D) auxiliarly seat belt means carried by said back support member and adapted to be interconnected with said safety belt
   (1) whereby the shoulders of said child are retained in said safety seat and said safety seat is retained in place on the seat of said vehicle;

(E) means carried by said back and seat support members and adapted to interconnect said back and seat support member when said seat support is removed from said frame; and (F) said last mentioned means including interlocking male and female members carried on the rear face of said back support member and the bottom face of said seat support member.

6. A child's safety seat for use on the seat of a vehicle having safety belts of the character described, comprising;

(A) a frame;

(B) a back support member
   (1) mounted on said frame;

(C) a seat support member
   (1) removably mounted on said frame at substantially right angles to said back support member;

(D) auxiliary seat belt means carried by said back support member and adapted to be interconnected with said safety belt
   (1) whereby the shoulders of said child are retained in place on the seat of said vehicle;

(E) means carried by said back and seat support members and adapted to interconnect said back and seat support member when said seat support is removed from said frame; and (F) said seat support member having parallel opposed cap members depending from its bottom surface and adapted to releasably engage said frame.

7. A child's safety seat for use on the seat of a vehicle having safety belts of the character described, comprising;

(A) a frame;

(B) a back support member
   (1) mounted on said frame;

(C) a seat support member
   (1) removably mounted on said frame at substantially right angles to said back support member;

(D) auxiliary seat belt means carried by said back support member and adapted to be interconnected with said safety belt
   (1) whereby the shoulders of said child are retained in said safety seat and said safety seat is retained in place on the seat of said vehicle;

(E) means carried by said back and seat support members and adapted to interconnect said back and seat support member when said seat support is removed from said frame; and (F) said frame including a tubular back portion and a tubular bottom portion; said bottom portion being telescopically received in said top portion.

8. A child's safety seat for use on the seat of a vehicle having safety belts of the character described, comprising;

(A) a frame;

(B) a back support member
   (1) mounted on said frame;

(C) a seat support member
   (1) removably mounted on said frame at substantially right angles to said back support member;

(D) auxiliary seat belt means carried by said back support member and adapted to be interconnected with said safety belt
   (1) whereby the shoulders of said child are retained in place on the seat of said vehicle;

(E) means carried by said back and seat support members and adapted to interconnect said back and seat support member when said support is removed from said frame; and (F) said back portion of said frame being generally U-shaped; said bottom portion thereof including a pair of tubes having an inverted P shape and being adapted to pivot relatively of the legs of said U-shaped back portion of said frame.

9. A child's safety seat of the character described, comprising;

(A) a back support member having at least one through opening adjacent its upper edge;

(B) a seat support member adapted to rest on the seat of an automobile or the like
   (1) whereby the occupant thereof will be elevated with respect to said seat;

(C) frame means connecting said back and seat support members together in substantially right angle relationship with each other;

(D) said frame means connecting said back and seat support member in said right angle relationship during the period of connection therewith;

(E) said frame means being aligned with said opening; and (F) a flexible safety belt passed through said opening and connected to said frame (1) whereby a closed loop portion thereof may be placed over the shoulders of an occupant and connected to the main seat belt of the vehicle.

10. A child's safety seat of the character described, comprising;

(A) a generally flat body supporting member of generally rectangular configuration and adapted to selectively serve (1) as a bed-like support for an infant or (2) as a back support for a larger child;

(B) said support member having at least one through opening provided therein;

(C) a frame member having support components along the opposed edges of said support and further having a transverse interconnecting support component that is aligned with said opening; and (D) a flexible safety belt adapted to be passed through said opening and secured to said frame component in such a fashion as to provide a closed loop portion that may be placed over the shoulders of an occupant positioned thereagainst and connected to the main seat belt of the vehicle.

References Cited

UNITED STATES PATENTS

| | | | |
|---|---|---|---|
| 2,324,421 | 7/1943 | Ouellette | 297—387 X |
| 3,186,762 | 6/1965 | Lucas | 297—250 X |
| 3,207,552 | 9/1965 | Loughney | 297—250 X |
| 3,220,769 | 11/1965 | Regan | 297—384 |
| 3,232,665 | 2/1966 | Von Wimmersperg | 297—390 |
| 3,325,213 | 6/1967 | Levy | 297—250 X |

FOREIGN PATENTS 268,088   3/1965   Australia.

JAMES T. McCALL, *Primary Examiner.*

U.S. Cl. X.R.

297—253